Figure 1:
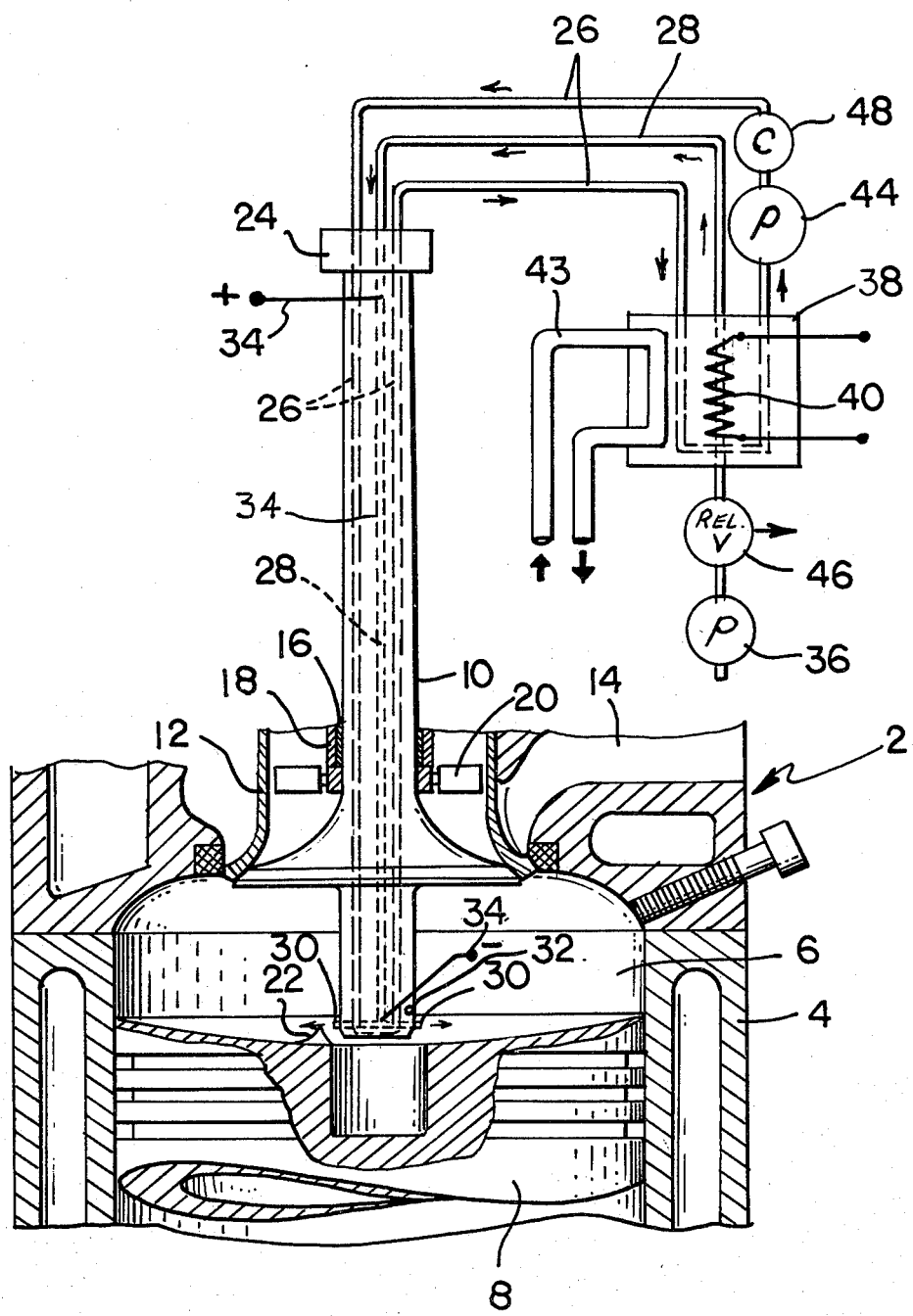

United States Patent [19]

Schaich

[11] 4,300,514
[45] Nov. 17, 1981

[54] DEVICE FOR VAPORIZING FUEL AND CONTROLLING THE TEMPERATURE OF THE FUEL IN AN INTERNAL COMBUSTION ENGINE

[76] Inventor: Josef Schaich, Oschle 118, 7906 Markbronn, Fed. Rep. of Germany

[21] Appl. No.: 75,832

[22] Filed: Sep. 14, 1979

[51] Int. Cl.³ ............................................. F02M 31/00
[52] U.S. Cl. ..................................... 123/557; 123/296
[58] Field of Search ........................ 123/296, 557, 558

[56] References Cited

U.S. PATENT DOCUMENTS

| | | | |
|---|---|---|---|
| 247,150 | 5/1949 | Anderson | 123/79 C |
| 1,361,503 | 12/1920 | Smith | 123/557 |
| 1,597,060 | 8/1926 | Crossley | 123/557 |
| 1,657,108 | 1/1928 | Clemers | 123/79 C |
| 1,786,946 | 12/1930 | Hofmann | 123/296 |
| 1,828,792 | 10/1931 | Tverbakk | 123/296 |
| 2,072,437 | 3/1937 | Wurtele | 123/296 |
| 2,935,055 | 5/1960 | Neir | 123/79 C |
| 3,762,378 | 10/1973 | Bitonti | 123/557 |
| 3,868,939 | 3/1975 | Friese | 123/557 |
| 4,058,091 | 11/1977 | Tanahashi | 123/296 |
| 4,103,658 | 8/1978 | Bernecker | 123/557 |
| 4,201,167 | 5/1980 | Bayley | 123/557 |

FOREIGN PATENT DOCUMENTS 22950 of 1907 United Kingdom .............. 123/79 C

Primary Examiner—Ronald H. Lazarus
Attorney, Agent, or Firm—Albert L. Jeffers; John F. Hoffman

[57] ABSTRACT

A device for vaporizing fuel in an internal combustion engine whereby the fuel-air ratio in the mixture zone is varied by controlling the temperature of the vaporized fuel without the need for changing the orifice cross section of the nozzle. The fuel is first heated by means of a first electric heater and by the hot engine exhaust gases flowing through a pipe in the heat exchanger. Additional heat may be applied to the fuel by means of the cooling oil returning from the nozzle and electrode carrier which injects the fuel into the combustion zone.

5 Claims, 1 Drawing Figure

DEVICE FOR VAPORIZING FUEL AND CONTROLLING THE TEMPERATURE OF THE FUEL IN AN INTERNAL COMBUSTION ENGINE

The present invention relates to a device for vaporizing, controlling the temperature of, and feeding a first partial supply of fuel into the cylinder of an internal combustion engine operated with charge stratification.

In a known device of this type, essential elements are located in the nozzle and electrode carrier. This arrangement results in a quite substantial increase in the oscillating masses. Moreover, failure of a single element will render the entire expensive assembly unserviceable.

In the known device, the cross section of the nozzle is changed mechanically. As the mechanical components required to effect this change in the nozzle cross section are part of the oscillating means, the latter and, thus, the susceptibility to failure are further increased.

The object of the present invention consists in designing a device of the type mentioned herein above in such a manner that the device consists of a plurality of individually replaceable, easily accessible modules, avoiding the drawbacks of prior art devices.

Further objects are the reduction of the oscillating masses and the substitution of electric functional units for highly stressed mechanical components.

These objectives are accomplished by means of the measures proposed in the following specification and the appended claims.

Coming from the fuel pump, the first partial supply of fuel flows into the fuel vaporizing device where the temperature of the fuel is raised and the fuel is vaporized by a heat exchange arrangement operating on oil (cooling and heating medium) which is heated electrically and by means of hot exhaust gases flowing through pipes which pass through the heat exchanger. Through a flexible connecting element in which all necessary lines are grouped together, oil from the fuel vaporizing device enters the nozzle and electrode carrier and advances in the nozzle and electrode carrier right up to the region of the nozzles. An electric pump provides for controlled circulation of the oil within the oil circuit. Before the oil from the fuel vaporizing device enters the nozzle and electrode carrier, it is cooled in an oil cooler. The temperature of the oil rises again in the nozzle region of the nozzle and electrode carrier. The temperature of the nozzle and electrode carrier can therefore be kept substantially constant in the nozzle region by removing excess heat energy with the oil while controlling the flow rate and temperature of the cooling oil.

In order to prevent the fuel vapor generated in the fuel vaporizing device from condensing in the lines leading to the nozzles, the fuel lines are arranged in or near the oil ducts which return the hot oil from the nozzle and electrode carrier to the fuel vaporizing device.

Raising the temperature of the vaporized fuel causes the discharge velocity of the fuel and, thus, the reach of the jet to be increased, resulting in a corresponding increase in the volume of the mixture zone in the piston-swept and compression spaces. These conditions are reversed if the temperature of the vaporized fuel drops while all other parameters remain unchanged. Consequently, the fuel-air ratio in the mixture zone can be varied by controlling the temperature of the vaporized fuel without any need for mechanical equipment.

There are two basic possibilities of controlling the temperature of the fuel discharged from the nozzles. If a PTC resistor for measuring the temperature is installed in the region of the nozzles and if the values measured by this PTC resistor, together with further measured values (engine speed, fuel pump delivery, angle of incidence of the guide vanes), are processed in an electronic control unit for controlling the heating current applied to the fuel vaporizing device, the fuel-air ratio can be adapted to varying driving conditions.

In order to reduce the inertia of the system and to prevent condensation and temperature changes of the vaporized fuel within the lines, it may be expedient to provide a further electric heating system between the fuel vaporizing device and the nozzles which raises the temperature of the fuel before the nozzles above a predetermined basic value, thereby controlling the temperature of the fuel as a function of specific operating parameters (engine speed, fuel pump delivery, angle of incidence of the guide vanes). This additional electric heating system can be disposed in such a manner that the fuel line from the fuel vaporizing device to the nozzles either wholly or partially forms part of an electric circuit. Electric and thermal insulation of the fuel line effectively prevents energy losses so that the thermal energy applied is actually transferred to the fuel which is thus discharged from the nozzles with the corresponding velocity (impetus). Alternatively, heating elements may be installed in or around the fuel line. A control loop with appropriate sensors, a computer and appropriate actuators must be provided for maintaining the basic temperature in the fuel vaporizing device and a further control loop is required for controlling the heating current and, thus, the temperature of the fuel vapor in the nozzle and electrode carrier.

If necessary, additional heat energy can be applied to the fuel vaporizing device by means of hot exhaust gases flowing through pipes.

Appropriate use of PTC resistors, electronic control devices and actuators enables the parameters of the fuel vapor to be matched to the other parameters, especially those related to the air swirl, via the heating agent/coolant in such a manner that the process may be optimized in terms of consumption and pollutant emission.

A mechanically or electrically controlled relief valve provided before or after the heat exchanger enables the fuel line to be relieved on completion of the mixture formation process. The gas pressure in the cylinder, which rises after completion of the mixture formation, forces the fuel which has built up in the line back into the tank via the relief valve so that no further fuel enters the cylinder during the expansion stroke.

FIG. 1 is a fragmentary view of an internal combustion engine incorporating the present invention.

The fuel vaporizing system according to the invention is shown installed in an internal combustion engine including a cylinder head 2, block 4 having cylinder 6 in which piston 8 reciprocates. The intake valve 10 is mounted within a tubular valve 12, which controls the flow of exhaust gases through exhaust port 14. Intake valve 10 is mounted for reciprocation within sleeve 16, which in turn is positioned internally of sleeve 18. Sleeve 18 carries movable guide vanes 20. Piston 8 carries at its rim a spoon-like element 22. Further details of the cylinder and valve arrangement shown are disclosed in applicant's copending U.S. Application Ser. No. 957,661 filed Nov. 3, 1978.

The intake valve 10 accommodates the nozzle and electrode carrier 24. The oil ducts disposed in the nozzle and electrode carrier 24 are denoted by the numeral 26 while the fuel lines extending next to the oil ducts 26 are identified by the numeral 28. The nozzles in the end region of the nozzle and electrode carrier 24 are denoted by the numeral 30. A PTC resistor 32 is provided in the region of the nozzles 30. The nozzle and electrode carrier also accommodates the second electric heating system 34.

The fuel pump 36 pumps the liquid fuel through a line to the fuel vaporizing device 38. Thermal energy is applied to the fuel vaporizing device 38 by means of the first electric heating system 40 and by means of the engine exhaust gases flowing through the pipes 43. Additional heat energy is applied to the fuel vaporizing device 38 by means of the cooling oil returning from the nozzle and electrode carrier 24. The oil circuit incorporates a circulating pump 44 and the rate of circulation can be controlled. The oil cooler (48) is provided in the region of the oil pump (44) and the oil line 26 leading to the nozzle and electrode carrier. The relief valve 46 is provided before or after the heat exchanger 38.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In an internal combustion engine including a combustion chamber, a mixture formation device comprising: a nozzle carrier having at least one fuel nozzle opening into said combustion chamber, a source of liquid fuel, fuel vaporizing means connected to said source of fuel for vaporizing the liquid fuel by heating the liquid fuel, a fuel conduit in said nozzle carrier connected to said fuel vaporizing means and to said nozzle for conveying the vaporized fuel to the nozzle, a closed loop recirculating system comprising: a conduit loop having a portion thereof in said nozzle carrier in close proximity to said nozzle and a portion thereof in said nozzle carrier in close proximity to said fuel conduit and a portion thereof in said fuel vaporizing means in heat exchange relation with the fuel in said fuel vaporizing means, and pump means for circulating a fluid through said closed loop conduit, whereby heat from the nozzle region of the nozzle carrier is imparted to the liquid fuel in the fuel vaporizing means and to the vaporized fuel in said fuel conduit.

2. The mixture formation device of claim 1 including means in close proximity to said nozzle for monitoring the temperature of vaporized fuel ejected from said nozzle.

3. The mixture formation device of claim 2 wherein said fuel vaporizing means includes a heat exchange means carrying exhaust gases for imparting heat from the exhaust gases to the liquid fuel in the fuel vaporizing means.

4. The mixture formation device of claim 2 including means connected in said conduit loop for cooling the fluid circulating through said conduit loop.

5. The mixture formation device of claim 2 wherein the fluid is oil.